(12) United States Patent
Katsuragi et al.

(10) Patent No.: US 6,471,350 B2
(45) Date of Patent: Oct. 29, 2002

(54) METHOD OF PROTECTING HEATER SURFACE OF INK-JET PRINTER, INK-JET RECORDING APPARATUS, RECORDING UNIT AND METHOD OF PROLONGING SERVICE LIFE OF INK-JET RECORDING HEAD

(75) Inventors: Ryuji Katsuragi, Tokyo (JP); Makoto Shioya, Kanagawa (JP); Hideto Yokoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/922,844

(22) Filed: Aug. 7, 2001

(65) Prior Publication Data

US 2002/0101476 A1 Aug. 1, 2002

(30) Foreign Application Priority Data

Sep. 8, 2000 (JP) ........................................ 2000-241520

(51) Int. Cl.$^7$ .................................................. B41J 2/01
(52) U.S. Cl. .......................................... 347/100; 347/96
(58) Field of Search ........................... 347/100, 64, 65, 347/101, 96; 106/31-58

(56) References Cited

U.S. PATENT DOCUMENTS

| | | | | |
|---|---|---|---|---|
| 4,335,389 A | * | 6/1982 | Shirato et al. | 347/64 |
| 4,990,939 A | * | 2/1991 | Sekiya et al. | 347/100 |
| 5,062,892 A | * | 11/1991 | Halko | 106/31.58 |
| 5,451,251 A | | 9/1995 | Mafune et al. | 106/22 |
| 5,462,590 A | | 10/1995 | Yui et al. | 106/20 R |
| 5,609,671 A | | 3/1997 | Nagasawa | 106/20 R |
| 5,702,510 A | * | 12/1997 | Yoshida et al. | 347/100 |
| 5,728,201 A | | 3/1998 | Saito et al. | 106/31.48 |
| 5,942,011 A | * | 8/1999 | Shirasaki et al. | 8/590 |
| 6,048,390 A | | 4/2000 | Yano et al. | 106/31.43 |
| 6,126,277 A | * | 10/2000 | Feinn et al. | 347/65 |

FOREIGN PATENT DOCUMENTS

| | | |
|---|---|---|
| EP | 0 437 078 A1 | 7/1991 |
| JP | 54-51837 | 4/1979 |
| JP | 5-186704 | 7/1993 |
| JP | 5-320550 | 12/1993 |
| JP | 6-220386 | 8/1994 |
| JP | 8-3498 | 1/1996 |
| JP | 10-36735 | 2/1998 |

OTHER PUBLICATIONS

Output Hardcopy Devices by Rober C. Durbeck, (Chapter: 13 Ink Jet Printer, pp. 311–370).*

* cited by examiner

Primary Examiner—John Barlow
Assistant Examiner—Manish Shah
(74) Attorney, Agent, or Firm—Fitzpatrick, Cella, Harper & Scinto

(57) ABSTRACT

The outermost surface protection layer of the heater of an ink-jet recording head containing at least metal or oxide thereof is protected against erosion by suppressing or preventing the dissolution of the outermost surface protection layer. The heater is adapted to apply thermal energy to a liquid composition to be ejected. The liquid composition contains a liquid medium, alkali metal ions and a compound expressed by general formula $H_2N-(CHY)_n-(CH_2)_m-X$, X representing a carboxyl group or a sulfonic acid group, Y representing a hydrogen atom, a carboxyl group or a sulfonic acid group, n representing 0 or 1, m representing an integer from 0 to 2. The liquid composition is heated so as to satisfy the relation as defined by the formula $1.10 \leq E_{op}/E_{th} \leq 1.90$, $E_{op}$ representing the amount of energy applied to the heater per unit time in order to cause the recording head to eject the liquid composition, $E_{th}$ representing the minimum amount of energy required by the recording head per unit time to eject ink.

17 Claims, 3 Drawing Sheets

METHOD OF PROTECTING HEATER SURFACE OF INK-JET PRINTER, INK-JET RECORDING APPARATUS, RECORDING UNIT AND METHOD OF PROLONGING SERVICE LIFE OF INK-JET RECORDING HEAD

BACKGROUND OF THE INVENTION

1. Field of the Invention

This invention relates to a method of protecting the surface of the heater of an ink-jet recording head, an ink-jet recording apparatus, a recording unit and a method of prolonging the service life of an ink-jet recording head.

2. Related Background Art

Various techniques have been proposed for printing using an ink-jet recording system. For instance, Japanese Patent Application Laid-Open No. 54-51837 describes an ink-jet method (a so-called bubble jet method) of ejecting ink droplets under the effect of thermal energy. This method provides a remarkable advantage of producing high quality images at high speed and low cost on ordinary plain paper not carrying any special coat layer because the method allows to prepare a high density multi-nozzle head with ease. With this method, the heater of the recording head is rapidly heated to cause the liquid laid on the heater to generate a bubble and quickly increase its volume so that liquid droplets (ink droplets) are ejected from the nozzle that is arranged at the front end of the recording head under the effect of the quick voluminal expansion of the liquid. Then, the ejected ink droplets are forced to fly and hit the target recording medium for printing.

However, when ink of a certain type, or ink containing alkali metal ions (sodium ions, lithium ions or the like) to be more specific, is used with this bubble jet method to produce a large volume of printed paper, the surface of the heater (heat generating resistor) of the recording head can become dissolved. Therefore, it is of vital importance to suppress or prevent the phenomenon of a dissolved surface of the heater of the recording head in order to provide high quality images on a stable basis, prolong the service life of the recording head and consequently reduce the load on the part of the environment. Thus, it has been and still is a technological challenge to provide improved recording heads from the above described point of view.

Japanese Patent Application Laid-Open No. 5-320550 discloses an ink composition containing ammonium salt such as ammonium halogenide or ammonium sulfonate up to 0.2 wt % in an attempt to dissolve this problem. However, halogenide ions and sulfonic acids are strongly acidic and corrosive. Therefore, when ink having such a composition is contained in the recording apparatus for a long time, the areas of the apparatus held in contact with the ink can become corroded and the effect of preventing a surface of the head of the recording head from being dissolved (etched) can be significantly lowered.

U.S. Pat. No. 5,462,590 (Japanese Patent Application Laid-Open No. 6-220386) discloses an ink composition containing water, a coloring material and an amine compound expressed by the general formula shown below to be used for thermal ink-jet recording;

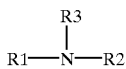

(where any one or each of any two of R1, R2 and R3 represents an alkyl group with one to five carbon atoms substituted by a carboxyl group, a sulfonic acid group or the Li, Na, K or ammonium salt thereof and each of the remaining two or the remaining one, whichever appropriate, of them represents an alkyl group with one to five carbon atoms substituted by a hydrogen atom, a hydroxyl group or a carbamoyl group).

Specific examples of amine compounds that can be used for the above ink composition include N,N-bis(2-hydroxyethyl)-2-aminosulfonic acid, N,N-bis(2-hydroxyethyl)glycine and aminoethane sulfonic acid (taurine). However, U.S. Pat. No. 6,048,390 (Japanese Patent Application Laid-Open No. 10-36735), the applicant of which is same as that of the above identified patent, describes that the addition of primary amine as covered by the above U.S. Pat. No. 5,462,590 does not necessarily result in any noticeable improvement in terms of kogation and the primary amine reacts itself near the heater due to the rapid temperature rise and becomes insoluble to aggravate the kogation when a dye having a carboxyl group is used and the pH level is regulated to between 6 and 8. In short, the patent document describes that the use of primary amine is far from advantageous under certain conditions.

SUMMARY OF THE INVENTION

Ink and the related liquid composition can contain alkali metal ions produced from hydroxide of alkali metal (such as lithium hydroxide, sodium hydroxide or potassium hydroxide) and operating as counter ions relative to the carboxyl group or the sulfonic acid group in the molecule of the coloring material in order to prevent the nozzle of the ink-jet recording head from clogging. As a result of a series of studies of the inventors of the present invention, it was found that, when solution containing an alkali metal ion is ejected repeatedly from a bubble jet system, the metal and/or the metal oxide of the outermost surface protection layer of the heater can become dissolved and the heater can give rise to broken wires to make the bubble jet system no longer able to eject ink and the related ink composition. The inventors of the present invention presume that, as the liquid composition (including ink) containing an alkali metal ion is heated excessively by the heater, the concentration of the alkali metal ion rises near the heater to make the composition highly alkaline, which by turn dissolves the protection layer on the outermost surface that is made of metal such as tantalum and/or metal oxide.

On the basis of this technological presumption, the inventors of the present invention examined the effect of adding primary amine that is denied in the above identified patent document to ink containing an alkali metal ion to find that the behavior of the added primary amine is vitally affected by the rate at which energy is applied to the heater. In other words, it is possible to maximally suppress the phenomenon of scraping the heater of ink containing both primary amine having a structure as shown in formula (1) below and an alkali metal ion by controlling the rate at which energy is applied to the heater. Additionally, the side effect of raising the level of kogation due to the addition of primary amine can be suppressed. The inventors of the present invention also found that the effect of energy control is not dependent on the type of the coloring material of the ink. More specifically, the effect of the present invention was proved for ink containing a dye having a carboxyl group with a pH level regulated to between 6 and 8 for which U.S. Pat. No. 6,048,390 reports that any addition of primary amine does not necessarily result in any noticeable improvement in terms of kogation.

On the basis of the above finding, it is therefore an object of the present invention to provide a method of protecting a surface of a heater of an ink-jet recording head to be used for applying thermal energy to the ink in the recording head and causing the recording head to eject ink.

Another object of the present invention is to provide an ink-jet recording apparatus that can print images with improved image quality and operate with a prolonged service life.

Still another object of the present invention is to provide a recording unit having a prolonged service life for printing. A further object of the present invention is to provide a method of prolonging the service life of a recording head that can print images with improved image quality at reduced cost.

In an aspect of the present invention, there is provided a method of protecting an outermost surface protection layer of a heater of an ink-jet printer having a recording head, the outermost surface protection layer of the heater containing at least metal or oxide thereof, said heater being used for an ink-jet printing process comprising the step of applying energy ($E_{op}$) to the heater to eject the liquid composition from the recording head, the liquid composition comprising a liquid medium, an alkali metal ion and a compound expressed by the following general formula (1):

$$H_2N\text{---}(CHY)_n\text{---}(CH_2)_m\text{---}X \qquad (1),$$

X representing a carboxyl group or a sulfonic acid group, Y representing a hydrogen atom, a carboxyl group or a sulfonic acid group, n representing 0 or 1, m representing an integer from 0 to 2;

wherein the energy ($E_{op}$) satisfies the relation as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

In another aspect of the invention, there is provided an ink-jet recording apparatus comprising a liquid composition container containing a liquid composition, an ink-jet recording head having a heater for applying thermal energy to the liquid composition in a liquid composition flow path led out from the liquid composition container and a means for applying a pulse-shaped electric signal to said heater according to the information to be recorded, said heater having an outermost surface protection layer containing at least metal or oxide thereof;

said liquid composition comprising a liquid medium, an alkali metal ion and a compound expressed by the following general formula (1):

$$H_2N\text{---}(CHY)_n\text{---}(CH_2)_m\text{---}X \qquad (1),$$

X representing a carboxyl group or a sulfonic acid group, Y representing a hydrogen atom, a carboxyl group or a sulfonic acid group, n representing 0 or 1, m representing an integer from 0 to 2;

said apparatus satisfying the relation as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

In still another aspect of the invention, there is provided a recording unit comprising a liquid composition container containing a liquid composition and an ink-jet recording head having an orifice for ejecting the liquid composition under the effect of thermal energy, said ink-jet recording head being provided with a heater for applying thermal energy to the liquid composition, said heater having an outermost surface protection layer containing at least metal or oxide thereof;

said liquid composition comprising a liquid medium, an alkali metal ion and a compound expressed by the following general formula (1)

$$H_2N\text{---}(CHY)_n\text{---}(CH_2)_m\text{---}X \qquad (1),$$

X representing a carboxyl group or a sulfonic acid group, Y representing a hydrogen atom, a carboxyl group or a sulfonic acid group, n representing 0 or 1, m representing an integer from 0 to 2;

said recording unit satisfying the relationship as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

In a further aspect of the invention, there is provided a method of prolonging a life span of a recording head to be used for an ink-jet recording method comprising a step of applying thermal energy to a liquid composition and causing it to be ejected through an orifice, said recording head being provided with a heater for applying thermal energy to the liquid composition, said heater having an outermost surface protection layer containing at least metal or oxide thereof;

said liquid composition comprising a liquid medium, an alkali metal ion and a compound expressed by the following general formula (1):

$$H_2N\text{---}(CHY)_n\text{---}(CH_2)_m\text{---}X \qquad (1),$$

X representing a carboxyl group or a sulfonic acid group, Y representing a hydrogen atom, a carboxyl group or a sulfonic acid group, n representing 0 or 1, m representing an integer from 0 to 2;

said method satisfying the relation as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

As pointed out earlier, the inventors of the present invention found that, when ink containing alkali metal ions (sodium ions, lithium ions or the like) is used with the above described bubble jet method to produce a large volume of printed paper, the surface of the outermost surface protection layer of the heater (heat generating resistor) of the recording head can become dissolved. Thus, the inventors of the present invention paid research efforts for finding a compound that can effectively suppress the possible dissolution of the outermost surface protection layer of the heater in the presence of alkali metal ions and came to find that a compound expressed by general formula (1) is highly effective. The present invention is based on this finding.

According to the invention, the possible dissolution of the outermost surface protection layer containing at least metal or oxide thereof of the heater can be effectively suppressed. While it is not clear why the use of such ink provides the effect of suppressing the possible dissolution of the outermost surface protection layer of the heater, the inventors of the present invention presume the effect arises in a manner as described below.

Since the compound expressed by general formula (1) and contained in ink as indispensable ingredient is an acid having an amino group, ampho-ions expressed by formula (i) and (ii) exist in aqueous solution of the compound;

$$H_3N^+\text{—}(CHY)_n\text{—}(CH_2)_m\text{—}COO^- \quad (i)$$

and $$H_3N^+\text{—}(CHY)_n\text{—}(CH_2)_m\text{—}SO_3^- \quad (ii),$$

(where Y in the formulas (i) and (ii) represents a hydrogen atom, a carboxyl group or a sulfonic acid group, n represents 0 or 1 and m representing an integer from 0 to 2).

If alkali metal ions and hydroxide ions as counter ions thereof exist, the hydroxide ions are neutralized by the ampho-ions (i) and (ii) so that the alkalinity of the solution is lessened near the heater so that the possible dissolution of the metal and/or the metal oxide of the surface of the outermost surface protection layer is suppressed. When sodium hydroxide is used as hydroxide of alkali metal, reactions expressed by formulas (I) and (II) below will take place.

$$H_3N^+\text{—}(CHY)_n\text{—}(CH_2)_m\text{—}COO^- + Na^+ + OH^- \rightarrow H_2N\text{—}(CHY)_n\text{—}(CH_2)_m\text{—}COO^-Na^+ + H_2O \quad (I)$$

$$H_3N^+\text{—}(CHY)_n\text{—}(CH_2)_m\text{—}SO_3^- + Na^+ + OH^- \rightarrow H_2N\text{—}(CHY)_n\text{—}(CH_2)_m\text{—}SO_3^-Na^+ + H_2O \quad (II)$$

Furthermore, as a result of the researches of the inventors of the present invention, it was found that the effect of preventing the possible dissolution of the outermost surface protection layer is boosted by the synergetic effect of the ink and the metal when tantalum and/or tantalum oxide are used respectively for the metal and/or the metal oxide.

Additionally, the effect of preventing the possible dissolution of the outermost surface protection layer containing metal and oxide thereof and arranged on the heater is further boosted when the relationship as defined by the formula below is satisfied;

$$1.10 \leq E_{op}/E_{th} \leq 1.90,$$

where $E_{op}$ represents the amount of energy applied to the heater per unit time in order to cause the recording head to eject the liquid composition and $E_{th}$ represents the minimum amount of energy required by the recording head per unit time to eject ink.

According to U.S. Pat. No. 5,462,590 (Japanese Patent Application Laid-Open No. 6-220386), kogation of ink to the heater and any possible malfunction of the heater can be avoided by using ink containing alkali metal ions and a primary amine compound with the ink-jet method described in the patent document. However, U.S. Pat. No. 5,462,590 (Japanese Patent Application Laid-Open No. 6-220386) does not describe anything about the amount of energy to be applied to the heater per unit time. Furthermore, in view of U.S. Pat. No. 6,048,390 (Japanese Patent Application Laid-Open No. 10-36735) filed after U.S. Pat. No. 5,462,590 (Japanese Patent Application Laid-Open No. 6-220386) and describing that the use of primary amine is not desirable and the present invention can be used with any ink regardless of the coloring material contained therein, it may be safe to presume that the energy applied to ink in U.S. Pat. No. 5,462,590 (Japanese Patent Application Laid-Open No. 6-220386), if such energy needs to be defined, is out of the scope of the present invention.

DESCRIPTION OF THE PREFERRED EMBODIMENTS

Figure 1:
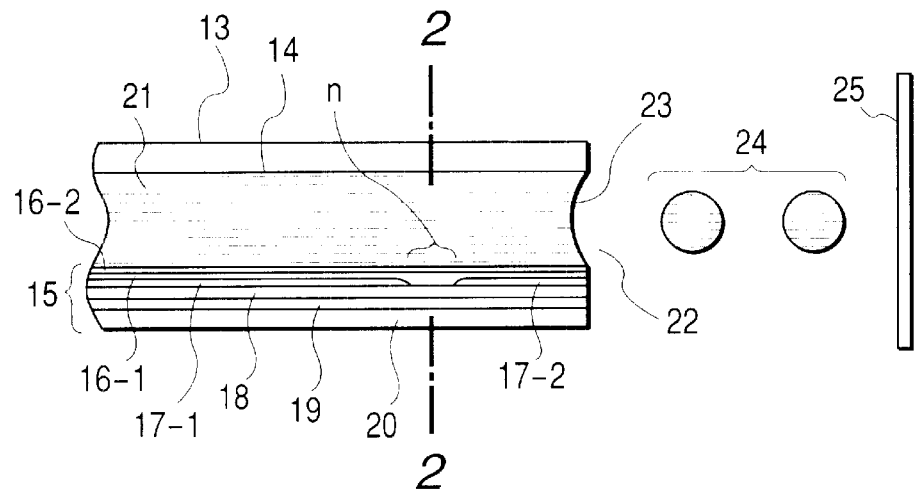
FIG. 1 is a schematic longitudinal cross sectional view of the recording head of an ink-jet recording apparatus according to the invention.

Now, the present invention will be described by referring to the accompanying drawings that illustrate preferred embodiments of the invention. Firstly, a liquid composition that can be used for the purpose of the invention will be described. A liquid composition to be used for the purpose of the present invention basically contains a liquid medium, alkali metal ions and a compound expressed by general formula (1)

$$H_2N\text{—}(CHY)_n\text{—}(CH_2)_m\text{—}X \quad (1),$$

where X represents a carboxyl group or a sulfonic acid group, Y represents a hydrogen atom, a carbyxyl group or a sulfonic acid group, n represents 0 or 1 and m represents an integer from 0 to 2.

As a result of intensive research efforts for finding a technique of effectively suppressing any dissolution of the metal and/or the metal oxide of the outermost surface protection layer of the heater of an ink-jet recording head to be used with an ink-jet recording method of ejecting ink droplets under the effect of thermal energy, the inventors of the present invention came to find that the objective of suppressing any dissolution of the metal and/or the metal oxide is achieved when the ink to be used with the recording head contains a compound expressed by the general formula (1) above. The present invention is based on this finding.

A. Compounds Expressed by General Formula (1)

Firstly, compounds that are expressed by the general formula (1) shown below will be discussed:

$$H_2N-(CHY)_n-(CH_2)_m-X \quad (1),$$

where X represents a carboxyl group or a sulfonic acid group, Y represents a hydrogen atom, a carbyxyl group or a sulfonic acid group, n represents 0 or 1 and m represents an integer from 0 to 2.

Specific examples of compounds expressed by the general formula (1) above that can suitably be used for a liquid composition for the purpose of the present invention include sulfamic acid (amidosulfonic acid), aminomethanesulfonic acid, taurine (2-aminoethanesulfonic acid), carbamic acid, glycine, β-alanine (2-aminopropionic acid), aspartic acid and glutamic acid. A compound expressed by the general formula (1) may be used in the acid form or in the salt form for the purpose of the invention. It may alternatively be used in the form of alkali metal salt, ammonium salt or organic amine salt such as triethanolamine, diethanolamine, monoethanolamine or triisopropanolamine.

The salt of a compound expressed by the general formula (1) may be commercially available or prepared by adding alkali to the compound, if it is an organic acid. Alkali compounds that can be used for preparing such salt include lithium hydroxide, sodium hydroxide, potassium hydroxide, magnesium hydroxide, calcium hydroxide, aqueous ammonia (ammonium hydroxide), organic amines (e.g., triethanolamine, diethanolamine, monoethanolamine, diisopropanolamine, triisopropanolamine, tetramethylammonium hydroxide, tetraethylammonium hydroxide and tetra-n-propylammonium hydroxide), of which lithium hydroxide, sodium hydroxide, potassium hydroxide and aqueous ammonia (ammonium hydroxide) are preferable.

Any of the above listed compounds may be used solely or any two of them may be used in combination.

The content of the compound(s) expressed by the general formula (1) in ink is between 0.005 and 20 wt % relative to the total weight of ink, preferably between 0.05 and 12 wt %. If the content is lower than 0.005 wt %, it will not be effective for suppressing the dissolution of the metal and/or the metal oxide. If, on the other hand, the content is higher than 20 wt %, the nozzles of the recording head can be clogged.

B. Coloring Materials

A liquid composition to be used for the purpose of the invention may be ink containing one or more than one coloring materials. Coloring materials that can be used for the purpose of the invention include the dyes and the pigments listed below.

B-1. Dyes

Dyes that can be used for the purpose of the invention include direct dyes, acid dyes, basic dyes and disperse dyes.

Non-limitative specific examples of dyes that can be used for the purpose of the invention are listed below:

C. I. Direct Black -4, -9, -11, -17, -19, -22, -32, -80, -151, -154, -168, -171, -194, -195;

C. I. Direct Blue -1, -2, -6, -8, -22, -34, -70, -71, -76, -78, -86, -142, -199, -200, -201, -202, -203, -207, -218, -236, -287;

C. I. Direct Red -1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -225, -227;

C. I. Direct Yellow -1, -2, -4, -8, -11, -12, -26, -27, -28, -33, -34, -41, -44, -48, -86, -87, -88, -132, -135, -142, -144;

C. I. Food Black -1, -2;

C. I. Acid Black -1, -2, -7, -16, -24, -26, -28, -31, -48, -52, -63, -107, -112, -118, -119, -121, -172, -194, -208;

C. I. Acid Blue -1, -7, -9, -15, -22, -23, -27, -29, -40, -43, -55, -59, -62, -78, -80, -81, -90, -102, -104, -111, -185, -254;

C. I. Acid Red -1, -4, -8, -13, -14, -15, -18, -21, -26, -35, -37, -52, -249, -257, -289;

C. I. Acid Yellow -1, -3, -4, -7, -11, -12, -13, -14, -19, -23, -25, -34, -38, -41, -42, -44, -53, -55, -61, -71, -76, -79

C. I. Reactive Blue -1, -2, -3, -4, -5, -7, -8, -9, -13, -14, -15, -17, -18, -19, -20, -21, -25, -26, -27, -28, -29, -31, -32, -33, -34, -37, -38, -39, -40, -41, -43, -44, -46;

C. I. Reactive Red -1, -2, -3, -4, -5, -6, -7, -8, -11, -12, -13, -15, -16, -17, -19, -20, -21, -22, -23, -24, -28, -29, -31, -32, -33, -34, -35, -36, -37, -38, -39, -40, -41, -42, -43, -45, -46, -49, -50, -58, -59, -63, -64, -180;

C. I. Reactive Yellow -1, -2, -3, -4, -6, -7, -11, -12, -13, -14, -15, -16, -17, -18, -22, -23, -24, -25, -26, -27, -37, -42;

C. I. Reactive Black -1, -3, -4, -5, -6, -8, -9, -10, -12, -13, -14, -18;

Projet Fast Cyan 2 (available from Zeneca), Projet Fast Magenta 2 (available from Zeneca), Projet Fast Yellow 2 (available from Zeneca), Projet Fast Black 2 (available from Zeneca).

B-2. Pigments

Any pigments including inorganic pigments and organic pigments may be used for the purpose of the invention. Non-limitative specific examples of pigments that can be used for the purpose of the invention are listed below:

C. I. Pigment Yellow -1, -2, -3, -12, -13, -14, -16, -17, -73, -74, -75, -83, -93, -95, -97, -98, -114, -128, -129, -151, -154, -195;

C. I. Pigment Red -5, -7, -12, -48 (Ca), -48 (Mn), -57 (Ca), 57:1, 57 (Sr), 112, 122, 123, 168, 184, 202;

C. I. Pigment Blue -1, -2, -3, -15:3, -15:34, -16, -22, -60;

C. I. Vat Blue -4, -6.

C. Dispersants

When any of the above listed pigments is used in the liquid composition, a dispersant may preferably be added in order to disperse the pigment in the liquid composition on a stable basis. A dispersant of the polymer type or the surfactant type may be used for the purpose of the invention. Examples of polymer type dispersants include polyacrylates, salts of styrene-acrylic acid copolymers, salts of styrene-methacrylic acid copolymers, salts of styrene-acrylic acid-acrylate copolymers, salts of styrene-maleic acid copolymers, salts of acrylate-maleic acid copolymers, salts of styrene-methacrylsulfonic acid copolymers, salts of vinylnaphthalene-maleic acid copolymers, salts of β-naphthalenesulfonic acid formalin condensate, polyvinylpyrrolidone, polyethyleneglycol and polyvinylalcohol. Any of the above listed compounds having an average molecular weight between 1,000 and 30,000 and an acid value between 100 and 430 may preferably be used for the purpose of the invention.

Examples of surfactant type dispersants include laurylbenzenesulfonate, laurylsulfonate, laurylbenzenecarboxylate, laurylnaphthalenesulfonate, salts of aliphatic amines and polyethylene oxide condensates. The ratio by weight of the pigment to the dispersant is preferably between 10:5 and 10:0.5.

D. Self-Dispersible Carbon Black

For the purpose of the present invention, self-dispersible carbon black as disclosed in Japanese Patent Application Laid-Open No. 5-186704 or Japanese Patent Application Laid-Open No. 8-3498 that is realized by introducing water-soluble groups onto the surfaces of carbon black particles may be used as coloring material. It will be appreciated that it will be no longer necessary to use a dispersant for the purpose of the invention when such self-dispersion type carbon black is employed.

Any one of the dyes and the pigments listed above may be used alone as coloring material for ink to be used for the purpose of the invention. Alternatively, two or more than two of them may be combined and used as coloring material. While there are no limitations to the concentration of the coloring material, the coloring material is preferably between 0.1 and 20 wt % relative to the total weight of ink.

E. Liquid Medium

Now, the liquid medium of the liquid composition will be described. For the purpose of the invention, a mixed solvent of water and a water-soluble organic solvent is preferably used as liquid medium of ink.

Water to be used preferably for the purpose of the invention is not ordinary water that contains various ions but deionized water. The water content of ink is preferably between 35 and 96 wt % of ink. The water-soluble organic solvent to be mixed with water may be selected from the organic solvents listed below depending on the application of ink. A water-soluble organic solvent is used to regulate the viscosity of ink to a level suitably for use. In other words, it is used typically to lower the drying rate of ink, increase the dissolution of the coloring material and prevent the nozzles of the recording head from being clogged.

Specific examples of water-soluble organic solvents that can be used for the purpose of the invention include alkyl alcohols with 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and keto-alcohols such as acetone and diacetone alcohol; ethers such as tetrahydrofuran and dioxane; oxyethylene and oxypropylene copolymers such as diethylene glycol, triethylene glycol, tetraethylene glycol, dipropylene glycol, tripropylene glycol, polyethylene glycol and polypropylene glycol; alkylene glycols with an alkylene group having 2 to 6 carbon atoms such as ethylene glycol, propylene glycol, trimethylene glycol, triethylene glycol and 1,2,6-hexatriol; glycerol; trimethyrolethane and trimethyrolpropane; lower alkyl ethers such as ethyleneglycolmonomethyl(or ethyl)ether, diethyleneglycolmonomethyl(or ethyl)ether and triethyleneglycolmonomethyl(or ethyl)ether; lower dialkyl ethers of polyhydric alcohols such as triethyleneglycoldimethyl(or ethyl) ether and tetraethyleneglycoldimethyl(or ethyl)ether; alkanol amines such as monoethanol amine, diethanol amine and triethanol amine; sulfolane, N-methyl-2-pyrrolidone, 2-pyrrolidone and 1,3-dimethyl-2-imidazolidinone. Any one of the above listed water-soluble organic solvents may be solely used. Alternatively, two or more than two of them may be combined for use.

F. Additives

If necessary one or more than one known additives may be selected from viscosity regulators, fungicides, antiseptics, antioxidants, defoamers, surfactants and nozzle moisturizing agents such as urea and added to the liquid composition for the purpose of the invention.

G. Properties of the Liquid Composition

The liquid composition containing the above listed ingredients and adapted to be used for ink-jet recording for the purpose of the present invention preferably have the following properties. The pH value at 25° C. of the liquid composition is preferably between 3 and 12, more preferably between 4 and 10. The surface tension of the liquid composition is preferably between 10 and 60 mN/m (dyn/cm), more preferably between 15 and 50 mN/m (dyn/cm). The viscosity of the liquid composition is preferably between 1 and 30 cps, preferably between 1 and 10 cps.

H. Alkali Metal Ions

The liquid composition to be used for the purpose of the invention may be prevented from adhering to the nozzles of the ink-jet recording head when an alkali metal ion is intentionally added thereto in advance. Specific examples of the alkali metal ion that can be used for the purpose of the invention include lithium ions, sodium ions, potassium ions that may be contained in dyes as counter ions. Other examples of the alkali metal ion include hydroxides such as lithium hydroxide, sodium hydroxide and potassium hydroxide, acetates such as lithium acetate, sodium acetate and potassium acetate and carbonates such as lithium carbonate, sodium carbonate, sodium hydrogencarbonate, potassium carbonate, potassium hydrogencarbonate and sodium potassium carbonate.

Any of the above listed alkali metal ions may be added solely to ink. The concentration of the added alkali metal ions is preferably between 0.01 and 3 wt %.

I. Ink-Jet Recording Method

A recording method to be suitably used for the purpose of the invention needs to be adapted to apply thermal energy to the liquid composition in the inner space of the recording head as a function of the recording signal supplied to the recording head and produce droplets by means of the thermal energy. Now, a recording apparatus that can suitably be used for the liquid composition having the above described ingredients will be described by referring to the accompanying drawings.

Figure 2:
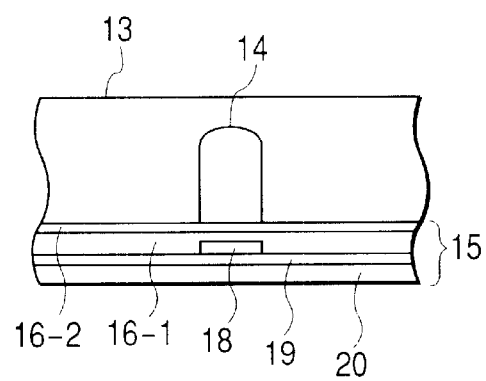
FIG. 2 is a schematic transversal cross sectional view of the recording head of the ink-jet recording apparatus of FIG. 1.

FIG. 1 is a schematic longitudinal cross sectional view of the recording head of an ink-jet recording apparatus according to the invention taken along the ink flow path of the head. FIG. 2 is a schematic transversal cross sectional view of the recording head of the ink-jet recording apparatus of FIG. 1 taken along line 2—2 in FIG. 1. Referring to FIGS. 1 and 2, the head 13 is formed by bonding a plate of glass, ceramic, silicon, polysulfone or plastic having a flow path (nozzle) 14 and a heat generating element substrate 15. The heat generating element substrate 15 comprises a protection layer 16-1 typically made of silicon oxide, silicon nitride and silicon carbide, an outermost surface protection layer 16-2 typically made of metal such as platinum or preferably tantalum or metal oxide such as platinum oxide or preferably tantalum oxide, electrodes 17-1 and 17-2 typically made of aluminum, gold or aluminum-copper alloy, a heat generating resistor layer 18 typically made of a high melting point material such as hafnium boride, tantalum nitride or tantalum aluminum, a heat storage layer 19 typically made of silicon oxide or aluminum oxide and a substrate 20 typically made of an efficiently heat-emitting material such as silicon, aluminum or aluminum nitride.

Figure 3:
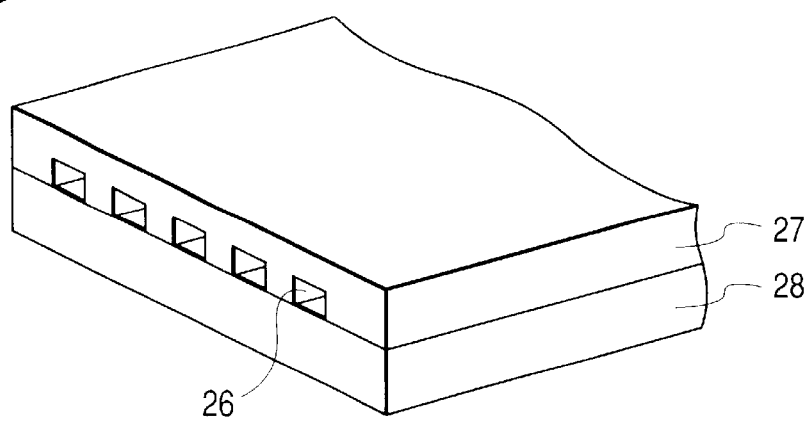
FIG. 3 is a schematic perspective view of a multi-head that can be used for the recording of FIG. 1.

As a pulse-shaped electric signal is applied to the electrodes 17-1 and 17-2 of the recording head 13, the region (heater) of the heat generating element substrate 15 indicated by n rapidly generates heat to by turn generate a bubble in the liquid composition 21 that is held in contact with the surface of the substrate 15. Then, the meniscus 23 is forced to project under pressure to consequently eject the liquid composition 21 through the nozzle 14 of the recording head. The ejected liquid composition 21 is reduced to droplets 24 by the ejection orifice 22, which droplets 24 are then forced to fly toward the recording medium 25. FIG. 3 is a schematic perspective view of a multi-head that can be used for the recording of FIG. 1. The multi-head is formed by bonding a glass plate 27 having a number of nozzles 26 and a heat generating head 28 similar to the one described above by referring to FIG. 1.

J. Rate of Application of Energy to the Heater

Now, the r value will be described. The r value is a factor representing the ratio of the energy that is actually applied to the critical energy that can eject droplets from the bubble jet head. If the width of the pulse applied to the bubble jet head is P (the sum of the pulse widths when the pulse is divided into a plurality of pulses, which are then applied to the bubble jet head), the applied voltage is V and the resistance of the heater is R, the applied energy E is expressed by formula (A) below.

$$E = P \times V^2 / R \quad (A)$$

If the critical energy that can eject droplets from the bubble jet head is $E_{th}$ and the energy that is actually applied to the head to drive the latter is $E_{op}$, the r value is defined by formula (B) below.

$$r = E_{op}/E_{th} \quad (B)$$

Either of the two methods as described below can be used to determine the value of r from the drive conditions of the bubble jet head.

(1) When the pulse width is fixed, the bubble jet head is driven to eject ink with the given pulse width and an appropriately selected voltage. Then, the voltage is gradually lowered until the ink ejection ceases. In this way, the minimum voltage required by the bubble jet head to eject ink can be determined. This voltage is referred to as $V_{th}$. If the voltage being used for the actual operation is $V_{op}$, r is given by formula (C) below.

$$r = (V_{op}/V_{th})^2 \quad (C)$$

(2) When the voltage is fixed, the bubble jet head is driven to eject ink with the given voltage and an appropriately selected pulse width. Then, the pulse width is gradually reduced until the ink ejection ceases. In this way, the minimum pulse width required by the bubble jet head to eject ink can be determined. This pulse width is referred to as $P_{th}$. If the pulse width being used for the actual operation is $P_{op}$, r is given by formula (D) below.

$$r = P_{op}/P_{th} \quad (D)$$

Note that the voltage is the one that is actually applied to the BJ heater in order to make it generate heat. The voltage that is applied externally to the head may fall due to the related contacts and wire resistance of the head. However, such fluctuations in the voltage are contained in both $V_{op}$ and $V_{th}$ when these voltages are observed so that the calculated value of r is affected little, if any, by the observation errors and no problem arises unless the fluctuations are particularly remarkable.

In the actual recording operation of a printer, care should be taken about that each of the heaters being used for driving the head can show such fluctuations in the voltage applied to the heater due to the influence of the other heaters.

From the above formulas (A) and (B), it may appear that the square of V and the value of P are inversely proportional relative to each other for a same value of r. However, in reality, the square of V and the value of P do not simply show an inversely proportional relationship because of various problems including electric problems such as the one that the pulse does not necessarily show a rectangular waveform, thermal problems such as the one that the pattern of thermal diffusion around the heater can vary depending on the pulse waveform and problems specific to a bubble jet head such as the one that, as the voltage changes, the thermal flux from the heater to the liquid composition changes to by turn change the bubbling of ink. Therefore, the methods of (1) and (2) above need to be handled independently. In other words, a value obtained by one of the methods should not be used to obtain a corresponding value for the other method because errors may become involved. As far as this specification is concerned, the value of r obtained by the method of (1) will be used unless specifically noted otherwise.

A value of r between 1.12 and 1.96 is normally selected for driving a recording head having the above described configuration to eject the liquid composition on a stable basis. However, when applying thermal energy to ink to cause the latter to be ejected from the recording head for the purpose of the invention, the metal and/or the metal oxide of the outermost surface protection layer of the heater is prevented from dissolving to consequently prolong the service life of the recording head provided that the value of r is found within a predetermined range. Specifically, this range is between 1.10 and 1.90, preferably between 1.12 and 1.75. While it is not clear why the outermost surface protection layer is prevented from dissolving to consequently prolong the service life of the recording head when the recording head is driven with the value of r found within the above range, the inventors of the present invention presume that the compound expressed by the general formula (1) protects the outermost surface protection layer to prevent the metal and/or the metal oxide of the outermost surface protection layer from being eroded and that no excessive energy is supplied to the heater to excessively raise the surface temperature of the heater and hence the metal of the outermost surface protection layer is prevented from being eroded excessively by hydrogen ions and other electrolytes when the recording head is driven under the above conditions.

Figure 4:
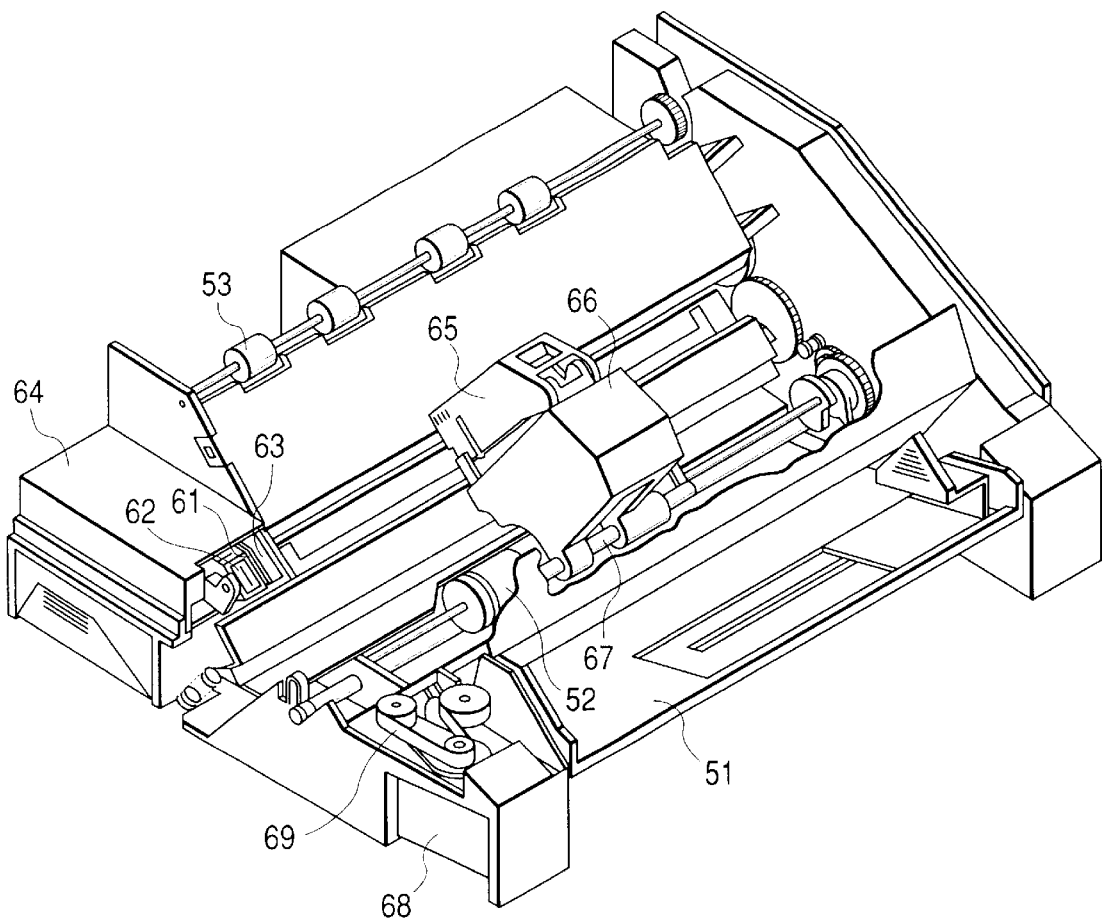
FIG. 4 is a schematic perspective view if an ink-jet recording apparatus according to the invention.

FIG. 4 is a schematic perspective view of an ink-jet recording apparatus according to the invention and comprising such a recording head. Referring to FIG. 4, reference numeral 61 denotes a blade operating as wiping member and having an end thereof rigidly held by means of a blade holding member so that it operates like a cantilever. The blade 61 is located at a position adjacent to the recording area of the recording head 65. In the illustrated arrangement, the blade 61 is held to a state where it is projecting into the moving route of the recording head 65.

Reference numeral 62 denotes a cap for covering the plane of the ejection orifices of the recording head 65. It is located at the home position that is located adjacently relative to the blade 61 and is adapted to move in a direction perpendicular to the moving direction of the recording head 65 so as to abut and cover the plane of the ink ejection orifices of the recording head 65. Reference numeral 63 denotes an ink absorbing member that is also located adjacently relative to the blade and, like the blade 61, held to a state where it is projecting into the moving route of the recording head 65. Said blade 61, said cap 62 and said ink absorbing member 63 form an ejection recovering section 64, of which the blade 61 and the ink absorbing member 63 remove the moisture and the dirt on the plane of the ejection orifices of the recording head.

Reference numeral 65 denotes the recording head that comprises an ejection energy generating means and is adapted to eject the liquid composition toward the recording medium located opposite to the plane of the ejection orifices. Reference numeral 66 denotes a carriage carrying the recording head 65 in order to move the recording head 65. The carriage 66 is slidably engaged with a guide shaft 67 and, although not shown, partly connected to a belt 69 that is driven to move by a motor 68. Thus, the carriage 66 can move along the guide shaft 67 so as to move the recording head 65 across the recording area and adjacent areas of the recording medium.

Reference numeral 51 denotes a sheet feeding section having a slot for feeding the recording medium and reference numeral 52 denotes a sheet feeding roller driven by a motor (not shown). With this arrangement, the recording medium, which is a sheet of paper, is fed to a position located opposite to the plane of the ejection orifices of the recording head 65. The cap 62 of the ejection recovery section 64 is retracted from the moving route of the recording head but the blade 61 is projecting into the moving route when the recording head 65 returns to the home position after a recording operation. Therefore, the blade 61 wipes and cleans the ejection orifices of the recording head 65.

As the cap 62 abuts and covers the plane of the ejection orifices of the recording head 65, the cap 62 moves to project into the moving route of the recording head 65. When the recording head 65 moves from the home position to the position for starting a recording operation, the cap 62 and the blade 61 are located at the respective positions same as those where they are found for a wiping operation. As a result, the plane of the ejection orifices of the recording head 65 is wiped and cleaned too during this movement. The movement to the home position of the recording head takes place not only at the end of each recording operation and during each operation of recovering the ink ejecting performance of the recording head but also at the time of the movement of the recording head across the recording area, during which the recording head also moves to the home position adjacent to the recording area and is wiped periodically at regular time intervals.

Figure 5:
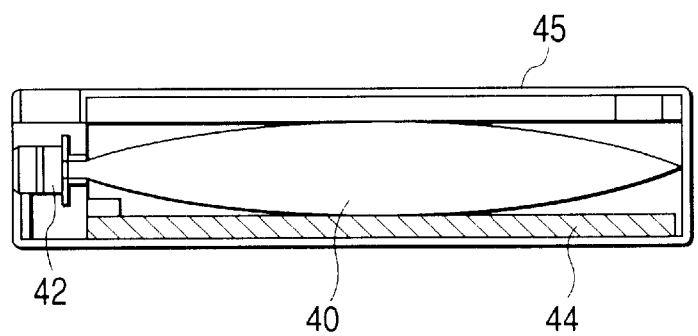
FIG. 5 is a schematic perspective view of the inside of an ink cartridge that can be used for the purpose of the invention.

FIG. 5 is a schematic perspective view of the inside of the liquid composition supplying member of the recording head that may be an ink cartridge containing the liquid composition, from which the liquid composition is supplied by way of a tube. Referring to FIG. 5, reference numeral 40 denotes the liquid composition containing section, which may be a bag that actually contains the liquid composition to be supplied to the ejection orifices and is provided at the front end thereof with a rubber plug 42. As a needle (not shown) is driven through the plug 42, the liquid composition in the bag 40 becomes to be able to be supplied to the recording head. Reference numeral 44 denotes an ink absorbing member for receiving the waste of the liquid composition. The surface of the liquid composition containing section to be held in contact with the liquid composition is preferably coated with polyolefin or polyethylene.

Figure 6:
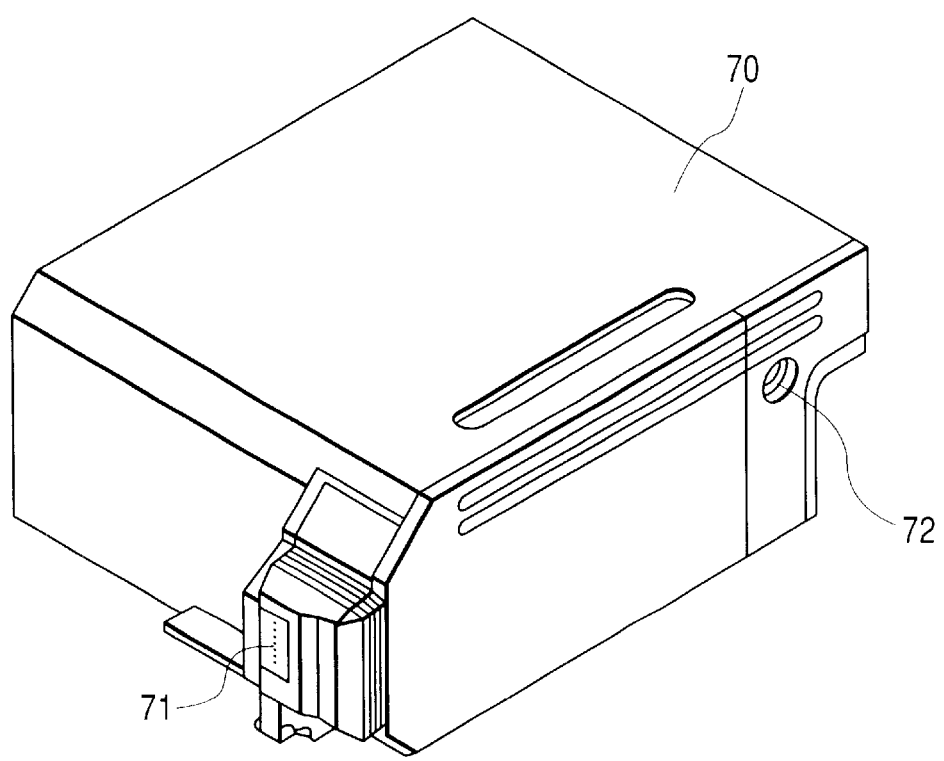
FIG. 6 is a schematic perspective view of a recording unit according to the invention.

For the purpose of the present invention, not only an ink-jet recording apparatus that comprises a recording head and a cartridge as independent components as described above but also a recording unit comprising both a recording head and a cartridge as integral parts thereof as shown in FIG. 6 may also suitably be used. Referring to FIG. 6, reference numeral 70 denotes a recording unit provided with a liquid composition containing section that typically comprises a liquid composition absorbing member. The liquid composition in the liquid composition absorbing member is eventually ejected from the head section 71 having a plurality of orifices as droplets of the liquid composition. For the purpose of the present invention, the liquid composition absorbing member is preferably made of polyurethane. The liquid composition containing section comprising the liquid composition absorbing member may be replaced by a liquid composition containing section containing a bag that is provided with a spring in the inside. Reference numeral 72 denotes an opening that allows the inside of the cartridge to communicate with the atmosphere. The recording unit 70 may replace the recording head 65 shown in FIG. 4 and is adapted to be removably fitted to the carriage 66.

EXAMPLES

Now, the present invention will be described further by way of examples and comparative examples, although the present invention is by no means limited to those examples and may be embodied in various different ways without departing from the scope of the invention. In the following description, the expressions of "portions" and "%" refer to those by weight unless specifically noted otherwise. The coloring matters used in the examples and the comparative examples have the respective chemical structures shown below.

C. I. Direct Yellow 132:

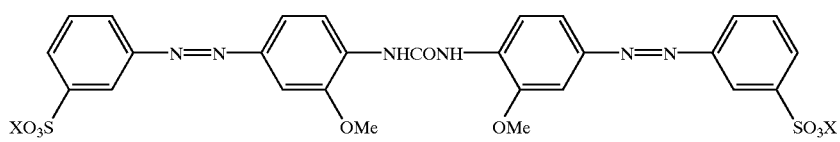

In the examples that follow, Na (sodium) was used for X in the above formula.

C. I. Acid Red 289:

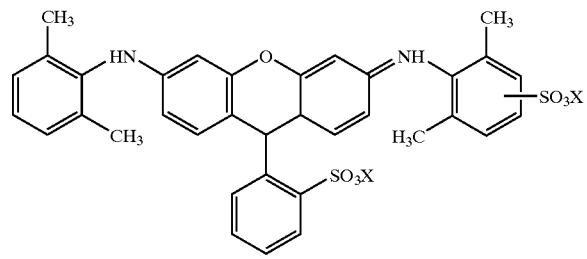

In the examples that follow, Na (sodium) was used for X in the above formula.

C. I. Acid Yellow 23:

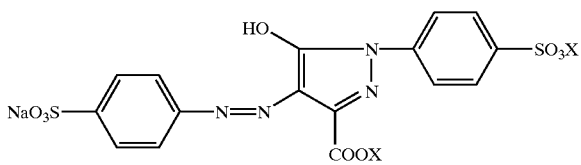

In the examples that follow, Na (sodium) was used for X in the above formula.
C. I. Direct Yellow 86:

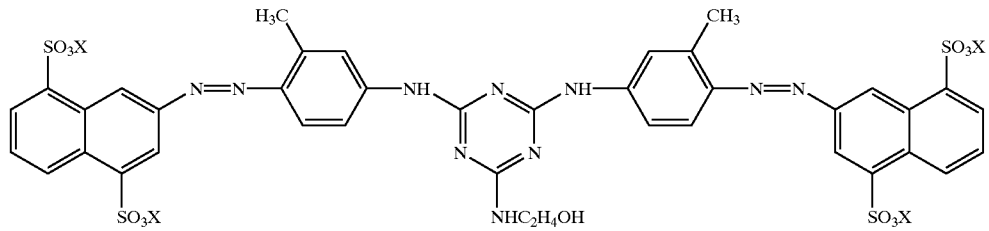

In the examples that follow, Na (sodium) was used for X in the above formula.
C. I. Food Black 2:

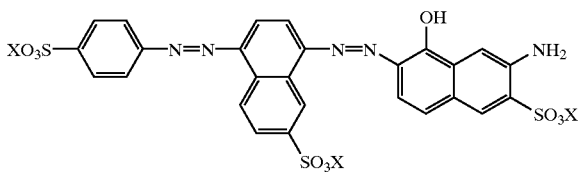

In the examples that follow, Na (sodium) was used for X in the above formula.

Examples 1 through 4

After mixing the ingredients listed below, the surface protection layer of the heater containing metal and/or metal oxide for protecting the heater were assessed after a number of ink ejecting operations by using the process and the rating system as described below. Table 1 shows the obtained results. The value of $V_{op}$ is calculated from the value of $V_{th}$ by using the formula below.

$$V_{op} = \sqrt{r} \times V_{th}$$

a: Ejection Durability

The ink ejecting operation was repeated continuously by using the above apparatus under the above drive conditions and the liquid droplets ejected from the recording were collected in a container for every consecutive $1 \times 10^6$ ejections and weighed by means of an electronic balance to determine the average weight of the ejected liquid droplets per shot in the consecutive $1 \times 10^6$ ejections by observing the increased weight of the container. The ink ejecting operation was repeated $3 \times 10^8$ times and the recording performance was assessed by using the rating system shown below.

A: The average weight of the ejected liquid droplets per shot between the $2.9 \times 10^8$ -th ejection and the $3 \times 10^8$ -th ejection was not less than 90% of the average weight of the ejected liquid droplets per shot in the initial consecutive $1 \times 10^6$ ejections.

B: The average weight of the ejected liquid droplets per shot between the $2.9 \times 10^8$ -th ejection and the $3 \times 10^8$ -th ejection was less than 90% and not less than 70% of the average weight of the ejected liquid droplets per shot in the initial consecutive $1 \times 10^6$ ejections.

C: The average weight of the ejected liquid droplets per shot between the $2.9 \times 10^8$ -th ejection and the $3 \times 10^8$ -th ejection was less than 70% of the average weight of the ejected liquid droplets per shot in the initial consecutive $1 \times 10^6$ ejections.

D: The ejection became impossible on the way. b: Erosion of the heater surface

The recording head was decomposed after the end of the above assessment of ejection durability and the surface of the nozzle heater used for the durability test was visually observed through an optical microscope (with a magnification of 400). The erosion of the outermost surface protection layer of the heater was assessed by using the rating system shown below.

A: No erosion was observed on the heater surface.

B: The heater surface was eroded slightly.

C: The heater surface was coarse and eroded to a large extent.

In Example 2, ink was ejected with a value of $V_{op}$ (drive voltage) that corresponds to r value=1.10. Similarly, in Example 3, ink was ejected with a value mixture was stirred well to dissolve the chemicals. Subsequently, the mixture was filtered through a micro-filter with a pore size of 0.2 μm (available from Fuji Photo Film Co., Ltd.) under pressure to prepare ink having composition A shown below.

| Ink Composition A | |
|---|---|
| C. I. Direct Yellow 132 | 3 portions |
| diethylene glycol | 10 portions |
| glycerol | 5 portions |
| taurine | 2 portions |
| aqueous ammonia 28% | 0.3 portions |
| water | 79.7 portions |

Assessment

Ink having the above composition was ejected from an ink-jet recording apparatus having an on-demand type multi-recording head (BC-02: tradename, available from Canon Co., Ltd., the outermost surface protection layer on the heater being made of tantalum and tantalum oxide) under the following conditions and the recording performance was assessed. Ink was ejected from the ink-jet recording apparatus in Example 1 with a pulse width of 1.1 μs (On)+3.0 μs (Off)+3.2 μs (On), a drive frequency of 6,250Hz and a drive voltage $V_{op}$ corresponding to r value=1.39 as determined by actually observing $V_{th}$ (critical voltage for ink ejection). Then, the ejection durability of the ink-jet recording head and the erosion of the outermost of $V_{op}$ (drive voltage) that corresponds to r value=1.50. In Example 4, ink was ejected with a value of $V_{op}$ (drive voltage) that corresponds to r value=1.70. The recording performance was assessed in each of the examples by using rating systems same as those of Example 1. Table 1 shows the obtained results.

Examples 5 through 10

For each of these examples, ink was prepared by mixing the ingredients listed below for the corresponding composition and stirring the mixture well to dissolve the chemicals. Subsequently, the mixture was filtered through a micro-filter with a pore size of 0.2 μm (available from Fuji Photo Film Co., Ltd.) under pressure to prepare ink having the applicable composition as listed below. Then, the recording performance of each of the examples was assessed by using the same rating systems as Examples 1 through 4 except that the value of $V_{op}$ (drive voltage) corresponding to r value=1.50 was used for the assessment.

| Ink Composition of Example 5 | |
|---|---|
| C. I. Direct Yellow 132 | 3 portions |
| diethylene glycol | 10 portions |
| glycerol | 5 portions |
| sulfamic acid | 1 portions |
| sodium hydroxide | 0.3 portions |
| water | 80.7 portions |
| Ink Composition of Example 6 | |
| C. I. Direct Yellow 132 | 3 portions |
| diethylene glycol | 10 portions |
| glycerol | 5 portions |
| aminomethane sulfonic acid | 2 portions |
| aqueous ammonia 28% | 0.5 portions |
| water | 79.5 portions |
| Ink Composition of Example 7 | |
| C. I. Direct Yellow 132 | 3 portions |
| diethylene glycol | 10 portions |
| glycerol | 5 portions |
| sodium L-aspartate (1 hydrate) | 1 portion |
| water | 81 portions |
| Ink Composition of Example 8 | |
| C. I. Acid Yellow 132 | 3 portions |
| diethylene glycol | 10 portions |
| glycerol | 5 portions |
| β-alanine | 1 portion |
| aqueous ammonia 28% | 0.3 portions |
| water | 80.7 portions |
| Ink Composition of Example 9 | |
| C. I. Acid Red 289 | 3 portions |
| diethylene glycol | 10 portions |
| glycerol | 5 portions |
| urea | 3 portions |
| taurine | 1 portion |
| sodium hydroxide | 0.1 portions |
| water | 87.9 portions |
| Ink Composition of Example 10 | |
| C. I. Acid Yellow 23 | 3 portions |
| diethylene glycol | 10 portions |
| glycerol | 5 portions |
| taurine | 1 portion |
| aqueous ammonia 28% | 0.3 portions |
| water | 80.7 portions |

The ink of Example 10 showed a pH value substantially equal to 7.0.

Examples 11 through 14

Ink showing Composition B was prepared by mixing the ingredients as in the case of the above described ink showing Composition A.

| Ink Composition B | |
|---|---|
| C. I. Direct Yellow 86 | 3 portions |
| diethylene glycol | 10 portions |
| glycerol | 5 portions |
| taurine | 0.5 portions |
| sodium hydroxide | 0.1 portions |
| water | 81.4 portions |

In these examples, the ejection durability and the erosion of the outermost surface protection layer of the heater were assessed by using the rating systems same as those of Examples 1 through 4 and different r values shown in Table 1 as in Examples 1 through 4. Examples 15 through 20 and Comparative Examples 1 through 3

For each of these examples and comparative examples, ink was prepared by mixing the ingredients listed below for the corresponding composition and stirring the mixture well to dissolve the chemicals. Subsequently, the mixture was filtered through a micro-filter with a pore size of 0.2 μm (available from Fuji Photo Film Co., Ltd.) under pressure to prepare ink having the applicable composition as listed below. Then, the recording performance of each of the examples was assessed in the same manner as in Examples 11 through 14 except that the value of $V_{op}$ (drive voltage) corresponding to r value=1.50 was used for the assessment. The results are shown in Table 1.

| Ink Composition of Example 15 | |
|---|---|
| C. I. Direct Yellow 86 | 3 portions |
| diethylene glycol | 10 portions |
| glycerol | 5 portions |
| sulfamic acid | 0.3 portions |
| sodium hydroxide | 0.1 portions |
| water | 81.6 portions |
| Ink Composition of Example 16 | |
| C. I. Direct Yellow 86 | 3 portions |
| diethylene glycol | 10 portions |
| glycerol | 5 portions |
| aminomethane sulfonic acid | 0.5 portions |
| aqueous ammonia 28% | 0.5 portions |
| water | 81 portions |
| Ink Composition of Example 17 | |
| C. I. Direct Yellow 86 | 3 portions |
| diethylene glycol | 10 portions |
| glycerol | 5 portions |
| sodium L-aspartate (1 hydrate) | 1 portion |
| water | 81 portions |
| Ink Composition of Example 18 | |
| C. I. Acid Yellow 86 | 3 portions |
| diethylene glycol | 10 portions |
| glycerol | 5 portions |
| β-alanine | 1 portion |
| aqueous ammonia 28% | 0.3 portions |
| water | 80.7 portions |
| Ink Composition of Example 19 | |
| C. I. Food Black 1 | 3 portions |
| thiodiglycol | 10 portions |
| glycerol | 5 portions |
| taurine | 0.5 portions |
| soditm hydroxide | 0.1 portions |
| water | 81.4 portions |

-continued

Ink Composition of Example 20

| | |
|---|---|
| diethylene glycol | 10 portions |
| glycerol | 5 portions |
| taurine | 0.7 portions |
| sodium hydroxide | 0.1 portions |
| water | 84.2 portions |

Ink Composition of Comparative Example 1

| | |
|---|---|
| C. I. Direct Yellow 86 | 3 portions |
| diethylene glycol | 10 portions |
| glycerol | 5 portions |
| sodium hydroxide | 0.1 portions |
| water | 81.9 portions |

Ink Composition of Comparative Example 2

| | |
|---|---|
| C. I. Food Black 2 | 3 portions |
| thiodiglycol | 10 portions |
| glycerol | 5 portions |
| sodium hydroxide | 0.1 portions |
| water | 81.9 portions |

Ink Composition of Comparative Example 3

| | |
|---|---|
| diethylene glycol | 10 portions |
| glycerol | 5 portions |
| sodium hydroxide | 0.1 portions |
| water | 84.9 portions |

As described above in detail, the invention provides ink to be used for ink-jet recording utilizing thermal energy that can effectively prevent any possible erosion of the metal and/or the metal oxide of the outermost surface protection layer of the heater of the recording head and consequently prolong the service life of the recording head. Additionally, according to the invention, there are also provided an effective method of protecting the heater surface, using such ink for ink-jet recording, an ink-jet recording method, an ink-jet recording apparatus, a recording unit and a method of prolonging the service life of an ink-jet recording head.

TABLE 1

| | compound expressed by general formula (1) | | coloring material | $V_{th}$ (V) | r value (Eop/Eth) | $V_{op}$ (V) | ejection durability | erosion of heater surface |
|---|---|---|---|---|---|---|---|---|
| | type | amount (portion) | | | | | | |
| Example 1 | taurine | 2 | C.I.Direct Yellow 132 | 21.0 | 1.39 | 24.8 | A | A |
| Example 2 | taurine | 2 | C.I.Direct Yellow 132 | 20.8 | 1.10 | 21.8 | A | A |
| Example 3 | taurine | 2 | C.I.Direct Yellow 132 | 21.1 | 1.57 | 26.4 | A | A |
| Example 4 | taurine | 2 | C.I.Direct Yellow 132 | 20.9 | 1.72 | 27.4 | A | A |
| Example 5 | sulfamic acid | 1 | C.I.Direct Yellow 132 | 21.1 | 1.57 | 26.4 | A | A |
| Example 6 | amino-methane sulfonic acid | 2 | C.I.Direct Yellow 132 | 21.0 | 1.56 | 26.2 | A | A |
| Example 7 | L-aspartic acid | 1 | C.I.Direct Yellow 132 | 20.9 | 1.56 | 26.1 | A | A |
| Example 8 | β-alanine | 1 | C.I.Direct Yellow 132 | 21.0 | 1.56 | 26.2 | A | A |
| Example 9 | taurine | 1 | C.I.Acid Red 289 | 21.1 | 1.57 | 26.4 | A | A |
| Example 10 | taurine | 2 | C.I.Acid Yellow 23 | 21.0 | 1.56 | 26.2 | A | A |
| Example 11 | taurine | 0.5 | C.I.Direct Yellow 86 | 21.0 | 1.39 | 24.8 | A | A |
| Example 12 | taurine | 0.5 | C.I.Direct Yellow 86 | 20.8 | 1.10 | 21.8 | A | A |
| Example 13 | taurine | 0.5 | C.I.Direct Yellow 86 | 21.1 | 1.57 | 26.4 | A | A |
| Example 14 | taurine | 0.5 | C.I.Direct Yellow 86 | 20.9 | 1.74 | 27.6 | A | A |
| Example 15 | sulfamic acid | 0.3 | C.I.Direct Yellow 86 | 21.1 | 1.57 | 26.4 | A | A |
| Example 16 | amino-methane sulfonic acid | 0.5 | C.I.Direct Yellow 132 | 21.0 | 1.56 | 26.2 | A | A |
| Example 17 | L-aspartic acid | 1 | C.I.Direct Yellow 132 | 20.9 | 1.56 | 26.1 | A | A |
| Example 18 | β-alanine | 1 | C.I.Direct Yellow 86 | 21.0 | 1.56 | 26.2 | A | A |
| Example 19 | taurine | 0.5 | C.I.Food Black 2 | 21.1 | 1.57 | 26.4 | A | A |

TABLE 1-continued

| | compound expressed by general formula (1) | | | | | | | erosion of |
| | type | amount (portion) | coloring material | Vth (V) | r value (Eop/Eth) | Vop (V) | ejection durability | heater surface |
|---|---|---|---|---|---|---|---|---|
| Example 20 | taurine | 0.7 | — | 21.0 | 1.56 | 26.2 | A | A |
| Comparative Example 1 | none | — | C.I.Direct Yellow 86 | 20.9 | 1.56 | 26.1 | D | B |
| Comparative Example 2 | none | — | C.I.Food Black 2 | 21.1 | 1.56 | 26.4 | D | B |
| Comparative Example 3 | none | — | — | 21.0 | 1.56 | 26.2 | D | C |

What is claimed is:

1. A method of protecting an outermost surface protection layer of a heater of an ink-jet printer having a recording head, said outermost surface protection layer of the heater containing at least metal or oxide thereof, said heater being used for an ink-jet printing process comprising the step of applying energy ($E_{op}$) to the heater to eject a liquid composition from the recording head, said liquid composition comprising an aqueous liquid medium, an alkali metal ion and a compound expressed by the following general formula (1):

$$H_2N\text{—}(CHY)_n\text{—}(CH_2)_m\text{—}X \qquad (1),$$

X representing a carboxyl group or a sulfonic acid group, Y representing a hydrogen atom, a carboxyl group or a sulfonic acid group, n representing 0 or 1, m representing an integer from 0 to 2;

wherein the energy ($E_{op}$) satisfies the relation as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

2. A method according to claim 1, wherein the X in said general formula (1) is a sulfonic acid group and Y in said general formula is a hydrogen atom.

3. A method according to claim 1, wherein the compound expressed by said general formula (1) is at least a compound selected from the group consisting of carbamic acid, glycine, β-alanine (2-aminopropionic acid), aspartic acid, glutamic acid, sulfamic acid (amidosulfonic acid), aminomethanesulfonic acid and taurine (2-aminoethanesulfonic acid).

4. A method according to claim 2, wherein the compound expressed by said general formula (1) is at least a compound selected from the group consisting of sulfamic acid (amidosulfonic acid), aminomethanesulfonic acid and taurine (2-aminoethanesulfonic acid).

5. A method according to claim 1, wherein the content of the compound expressed by said general formula (1) is between 0.005 and 20 wt % relative to the total weight of the liquid composition.

6. A method according to claim 1, wherein said metal is tantalum.

7. A method according to claim 1, wherein said alkali metal ion is selected from the group consisting of lithium ion, sodium ion and potassium ion.

8. A method according to claim 1, wherein said liquid composition further contains a coloring material.

9. An ink-jet recording apparatus comprising a liquid composition container containing a liquid composition, an ink-jet recording head having a heater for applying thermal energy to the liquid composition and a means for applying a pulse-shaped electric signal to said heater according to the information to be recorded, said heater having an outermost surface protection layer containing at least metal or oxide thereof;

said liquid composition comprising an aqueous liquid medium, an alkali metal ion and a compound expressed by the following general formula (1):

$$H_2N\text{—}(CHY)_n\text{—}(CH_2)_m\text{—}X \qquad (1)$$

X representing a carboxyl group or a sulfonic acid group, Y representing a hydrogen atom, a carboxyl group or a sulfonic acid group, n representing 0 or 1, m representing an integer from 0 to 2;

said apparatus satisfying the relation as defined by the following formula (2):

$$1.10 \leq E_{op}/E_{th} \leq 1.90 \qquad (2),$$

$E_{op}$ representing the energy applied to the heater in order to cause the recording head to eject the liquid composition, $E_{th}$ representing the minimum energy required by the recording head to eject the liquid composition.

10. An ink-jet recording apparatus according to claim 9, wherein said metal is tantalum.

11. An ink-jet recording apparatus according to claim 9, wherein said liquid composition further contains a coloring material.

12. A recording unit comprising a liquid composition container containing a liquid composition and an ink-jet recording head having an orifice for ejecting the liquid composition under the effect of thermal energy, said ink-jet recording head being provided with a heater for applying thermal energy to the liquid composition, said heater having an outermost surface protection layer containing at least metal or oxide thereof; said liquid composition comprising an aqueous liquid medium, an alkali metal ion and a compound expressed by the following general formula (1):

$$H_2N\text{—}(CHY)_n\text{—}(CH_2)_m\text{—}X \qquad (1),$$

X representing a carboxyl group or a sulfonic acid group, Y representing a hydrogen atom, a carboxyl group or a sulfonic acid group, n representing 0 or 1, m representing an integer from 0 to 2:

said recording unit satisfying the relation as defined by the following formula (2):

$$1.10 \leq E_{op}/E_{th} \leq 1.90 \quad (2),$$

$E_{op}$ representing the energy applied to the heater in order to cause the recording head to eject the liquid composition, $E_{th}$ representing the minimum energy required by the recording head to eject the liquid composition.

13. A recording unit according to claim 12, wherein said metal is tantalum.

14. A recording unit according to claim 12, wherein said liquid composition further contains a coloring material.

15. A method of prolonging a life span of a recording head to be used for an ink-jet recording method comprising a step of applying thermal energy to a liquid composition and causing it to be ejected through an orifice, said recording head being provided with a heater for applying thermal energy to the liquid composition, said heater having an outermost surface protection layer containing at least metal or oxide thereof;

said liquid composition comprising an aqueous liquid medium, an alkali metal ion and a compound expressed by the following general formula (1):

$$H_2N-(CHY)_n-(CH_2)_m-X \quad (1),$$

X representing a carboxyl group or a sulfonic acid group, Y representing a hydrogen atom, a carboxyl group or a sulfonic acid group, n representing 0 or 1, m representing an integer from 0 to 2;

said method satisfying the relation as defined by the following formula (2):

$$1.10 \leq E_{op}/E_{th} \leq 1.90 \quad (2),$$

$E_{op}$ representing the energy applied to the heater in order to cause the recording head to eject the liquid composition, $E_{th}$ representing the minimum energy required by the recording head to eject the liquid composition.

16. A method according to claim 15, wherein said metal is tantalum.

17. A method according to claim 15, wherein said liquid composition further contains a coloring material.

* * * * *

UNITED STATES PATENT AND TRADEMARK OFFICE
CERTIFICATE OF CORRECTION

PATENT NO.     : 6,471,350 B2
DATED          : October 29, 2002
INVENTOR(S)    : Katsuragi et al.

It is certified that error appears in the above-identified patent and that said Letters Patent is hereby corrected as shown below:

Title page,
Item [30], Foreign Application Prioriy Data: "Sep. 8, 2000" should read -- Aug. 9, 2000 --.

Column 6,
Line 31, "if" should read -- of --; and
Line 53, "carbyxyl" should read -- carboxyl --.

Column 7,
Line 6, "carbyxyl" should read -- carboxyl --.

Column 8,
Line 9, "-79" should read -- -79; --.

Column 15,
Line 41, "the surface" should read as follows:

--the mixture was stirred well to dissolve the chemicals. Subsequently, the mixture was filtered through a microfilter with a pore size of 0.2µm (available from Fuji Photo Film Co., Ltd.) under pressure to prepare ink having composition A shown below.
Ink Composition A

| | |
|---|---|
| C. I. Direct Yellow 132 | 3 portions |
| diethylene glycol | 10 portions |
| glycerol | 5 portions |
| taurine | 2 portions |
| aqueous ammonia 28% | 0.3 portions |
| water | 79.7 portions |

Assessment
Ink having the above composition was ejected from an ink-jet recording apparatus having an on-demand type multi-recording head (BC-02: tradename, available from Canon Co., Ltd., the outermost surface protection layer on the heater being made of tantalum and tantalum oxide) under the following conditions and the recording performance was assessed. Ink was ejected from the ink-jet recording apparatus in Example 1 with a pulse width of 1.1µs (On) + 3.0µs (Off) + 3.2µs (On), a drive frequency of 6,250Hz and a drive voltage $V_{op}$ corresponding to r value = 1.39 as determined by actually observing $V_{th}$ (critical voltage for ink ejection). Then, the ejection durability of the ink-jet recording head and the erosion of the outermost surface--.

UNITED STATES PATENT AND TRADEMARK OFFICE
CERTIFICATE OF CORRECTION

PATENT NO.   : 6,471,350 B2
DATED        : October 29, 2002
INVENTOR(S)  : Katsuragi et al.

It is certified that error appears in the above-identified patent and that said Letters Patent is hereby corrected as shown below:

Column 16,
Line 8, "b: Erosion" should begin a new paragraph;
Line 36, "mixture was stirred" should be deleted;
Lines 37-64, should be deleted; and
Line 65, "and the erosion of the outermost" should be deleted.

Column 18,
Line 16, "Examples" should begin a new paragraph; and
Line 65, "soditim" should read -- sodium --.

Column 22,
Line 32, "(1)" should read -- (1), --; and
Line 62, "said" should begin a new paragraph.

Column 23,
Line 4, "2:" should read -- 2; --.

Signed and Sealed this

Ninth Day of September, 2003

JAMES E. ROGAN
*Director of the United States Patent and Trademark Office*